July 3, 1962     A. FERRI     3,041,827
SUPERSONIC INLET
Filed Feb. 25, 1959     3 Sheets-Sheet 1
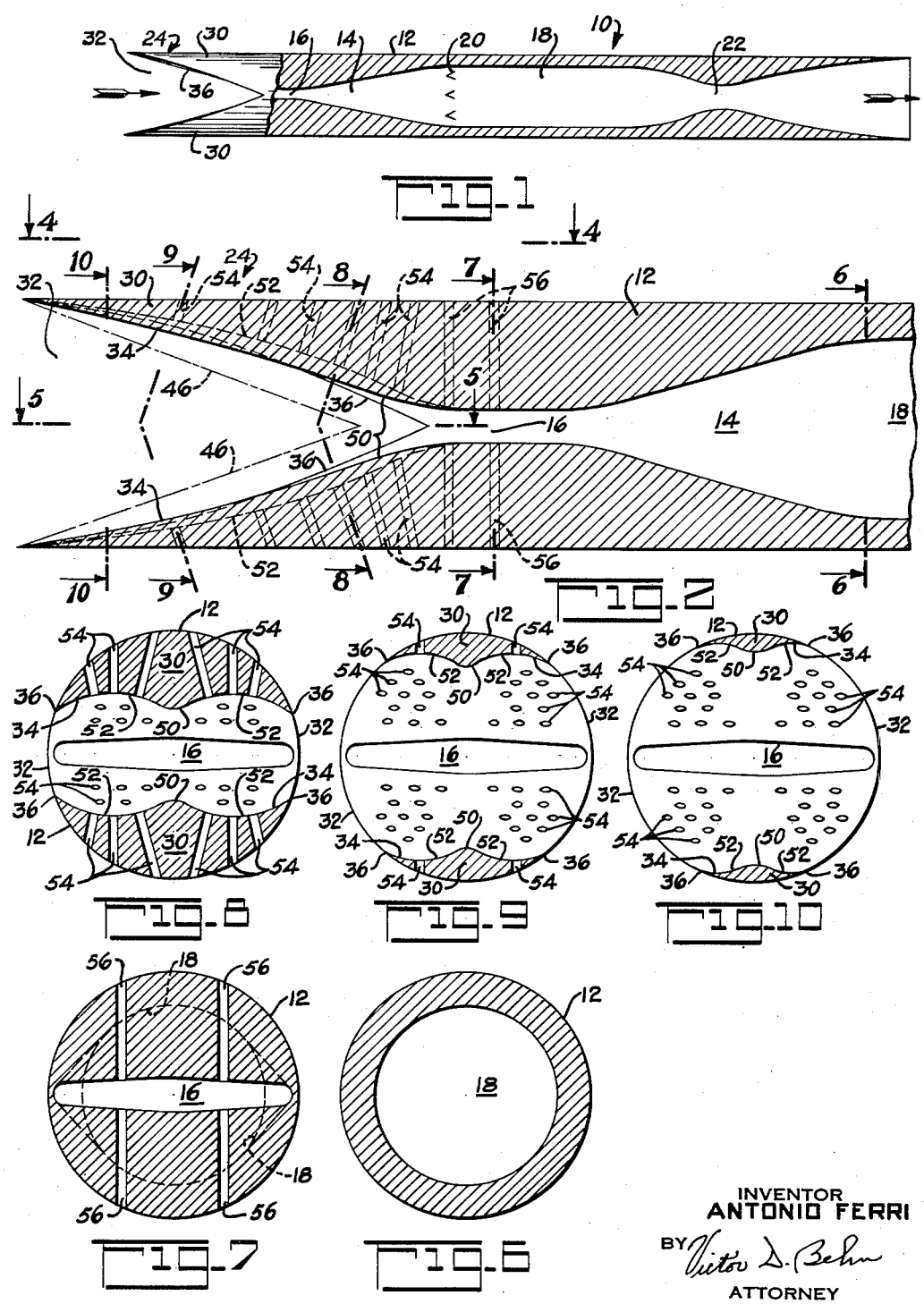
INVENTOR
ANTONIO FERRI
BY *Victor D. Behn*
ATTORNEY

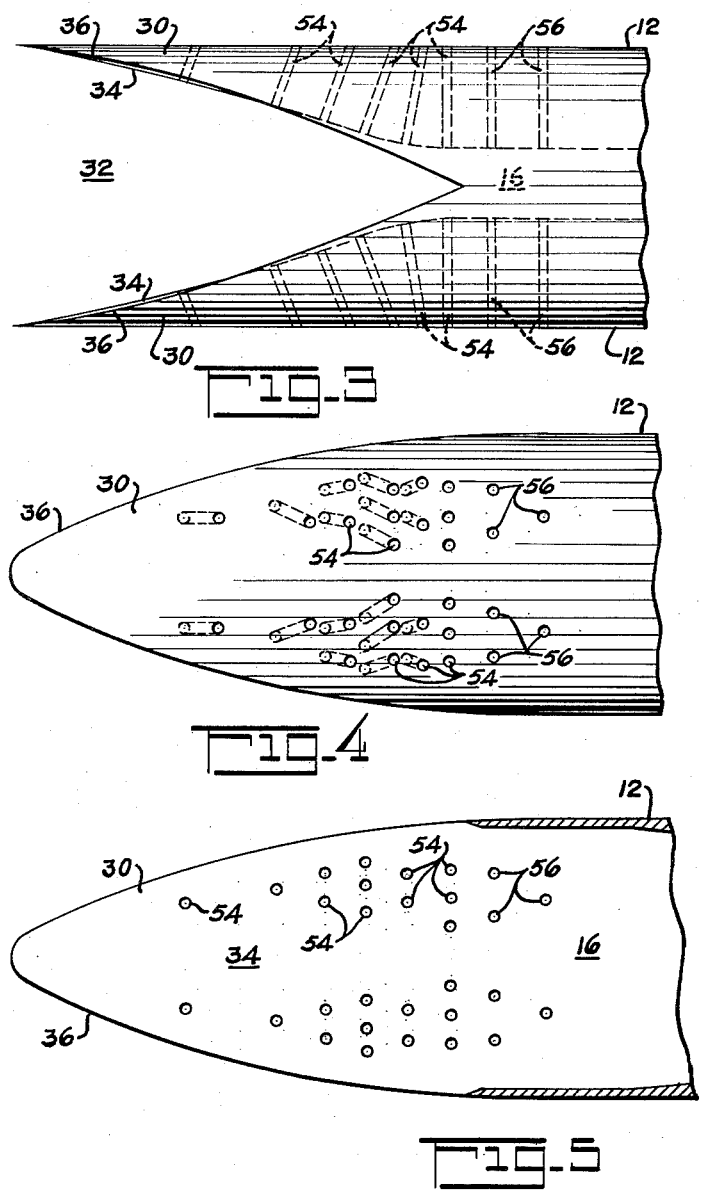

July 3, 1962

A. FERRI 3,041,827

SUPERSONIC INLET

Filed Feb. 25, 1959

INVENTOR
ANTONIO FERRI

BY *Victor D. Behr*

ATTORNEY

United States Patent Office 3,041,827
Patented July 3, 1962

3,041,827
SUPERSONIC INLET
Antonio Ferri, Rockville Centre, N.Y., assignor to Curtiss-Wright Corporation, a corporation of Delaware
Filed Feb. 25, 1959, Ser. No. 795,492
9 Claims. (Cl. 60—35.6)

This invention relates to supersonic aircraft and is particularly directed to the engine air inlet structure for such aircraft. As used herein the term aircraft is intended to include missiles.

Air breathing jet engines such as ramjet engines, designed for supersonic flight require air inlets having supersonic entering flow to supply the mass air flow requirements of the engine. Within the engine, however, the air velocity generally must be subsonic for efficient combustion. Hence, the engine air inlet structure should reduce the supersonic entering velocity to a subsonic value and for efficient operation this should be done with a minimum loss of total pressure of said air. Minimum loss of total pressure in going from supersonic to subsonic flow means that there has been a maximum conversion of the velocity head of the entering air to pressure. That is the inlet is operating with high pressure recovery.

A supersonic air inlet generally has a throat downstream of its leading edge. With supersonic entering air flow the inlet is said to have "started" when the transition from supersonic to subsonic inlet air flow occurs at the inlet throat or at some point downstream therefrom. This transition from supersonic to subsonic flow is marked by a normal or strong compression shock within the inlet.

The air inlet structure of the present invention is intended for high supersonic flight speeds for example in a flight Mach number range of 3 to 5. Accordingly, a large amount of compression is required to reduce the supersonic entering velocity. Because of the relatively high loss of total pressure across a strong shock, if high pressure recovery is to be obtained only a small amount of compression can be obtained by strong shock waves. Accordingly, it is an object of this invention to provide a novel supersonic air inlet in which the major portion of the compression is obtained isentropically along compression surfaces and only a minor portion by means of strong compression shocks.

Operation of such an air inlet at high supersonic flight speeds requires a large pressure rise along the isentropic compression surfaces. A large pressure rise along a supersonic compression surface tends to cause separation of the boundary layer of air flowing along said surface. Accordingly, a further object of the invention comprises the provision of a novel supersonic air inlet in which the inlet compression surfaces are designed to minimize the build-up of any boundary layer of air on said surfaces. More specifically the inlet compression surfaces are designed to cause the boundary layer of air on each surface to converge to a localized area or areas from which it can be removed.

A still further object of the invention comprises the provision of a novel circular air inlet in which the inlet is provided with a plurality of compression surfaces, said compression surfaces being spaced to leave openings therebetween to facilitate starting of the inlet.

Other objects of the invention will become apparent upon reading the annexed detailed description in connection with the drawing in which:

FIG. 1 is an axial sectional view through a ramjet engine having an air inlet structure embodying the invention;

FIG. 2 is an enlarged view of the air inlet structure of FIG. 1;

FIG. 3 is a plan view of FIG. 2 viewed from a plane outside the inlet and parallel to the plane of FIG. 2;

FIG. 4 is a plane view of FIG. 2 as viewed from line 4—4 of FIG. 2, FIGS. 3 and 4 being viewed from planes at right angles to each other;

FIG. 5 is a view of the compression surface of one of the inlet finger-like members as viewed from line 5—5 of FIG. 2;

Figure 13:
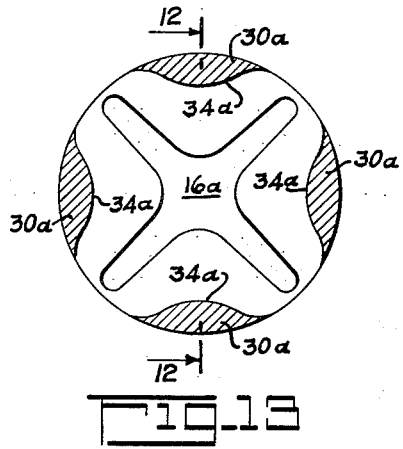
Figure 12:
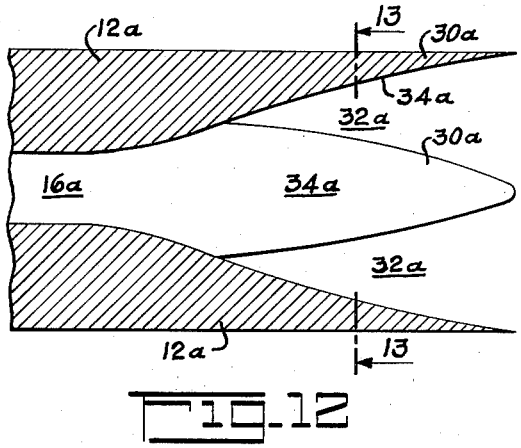
Figure 11:
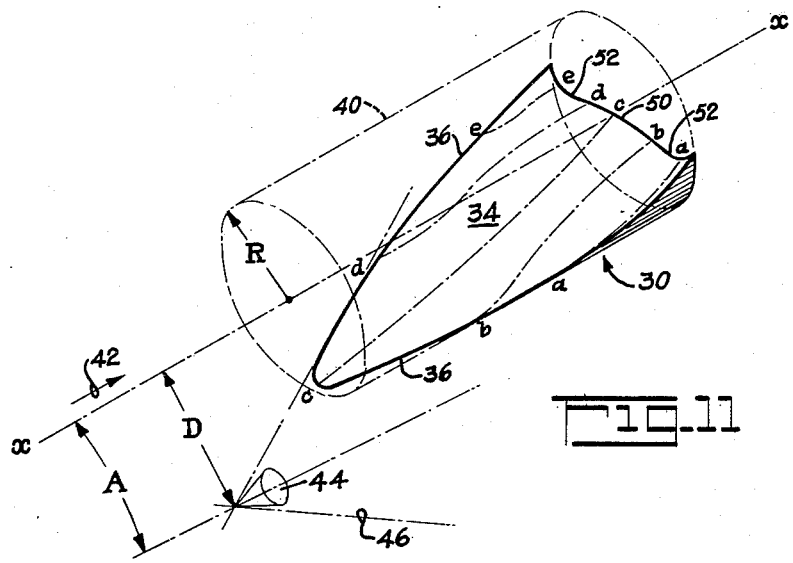

FIGS. 6, 7, 8, 9 and 10 are transverse sectional views taken along lines 6—6, 7—7, 8—8, 9—9 and 10—10 of FIG. 2;

FIG. 11 is a diagram in perspective illustrating a method of determining the shape of the inlet compression surfaces;

FIG. 12 is a sectional view corresponding to FIG. 2 but illustrating a modification, this figure being taken along line 12—12 of FIG. 13;

FIG. 13 is a transverse sectional view taken along line 13—13 of FIG. 12.

Referring first to FIG. 1 of the drawing, a ramjet engine 10 is illustrated as comprising a body member 12 having an air inlet passage 14 with a throat at 16. The air inlet passage 14 supplies air to the engine combustion chamber 18 to which fuel is supplied for combustion in said chamber. The fuel supply and flameholder apparatus for the combustion chamber 18 is schematically indicated at 20. From the combustion chamber the combustion gases discharge rearwardly through an exhaust nozzle 22. The forward end of the engine 10 is provided with an air inlet structure 24 for precompressing the air entering the inlet passage 14. The details of the inlet structure 24 are shown in the enlarged views of FIGS. 2-10.

As illustrated in FIGS. 2-10, the air inlet structure 24 includes two finger-like members 30 extending upstream from the ramjet body member 12. The finger-like members 30 preferably are identical and each tapers in circumferential width such that the circumferential spacing between these members is a maximum at their forward or upstream ends. In this way triangular or V-shaped openings 32 are formed between the members 30 with the apex of each said opening being disposed adjacent to the downstream ends of said members 30.

The outer surface of each of the finger-like extension members 30 comprises a smooth continuation of the outer surface of the ramjet body member 12. As illustrated, outer surface of the body member 12 is a circular cylinder and the outer surface of each of the finger-like extension members 30 is cylindrical with the same radius as said body member cylindrical surface.

The inner surface 34 of each finger-like extension member 30 is formed to provide an isentropic compression surface for the entering air such that the boundary layer air tends to collect in localized regions. At the periphery 36 of each said finger-like member 30 its compression surface is formed to produce a conical shock within the inlet which intersects a similar conical shock produced at the periphery of the other finger-like extension member 30.

The periphery 36 and compression surface 34 of each finger-like member 30 may be constructed and determined by considering the intersection of a hypothetical conical shock wave with a forward extension of the engine body member 12. This may best be understood by referring to FIG. 11.

In FIG. 11 reference numeral 40 designates a hypothetical, co-axial and forward extension of the cylindrical engine body member 12. Air flow is assumed to be approaching the inlet parallel to the axis of the extension 40, as indicated by the arrow 42, at the supersonic velocity for which the engine 10 is designed. A hypothetical cone 44 is placed in said airstream at a small angle of attack or jaw A and reference numeral 46 indicates the conical shock wave off the nose of said cone. As illustrated the apex of the cone is outside the cylinder 40, that is, the distance D between said apex and the axis X—X of the cylinder 40 is greater than the radius R of the cylinder. The cylinder axis X—X obviously is the same as the axis of the inlet.

The intersection of the conical shock 46 with the surface of the cylindrical extension 40 forms a line on said surface. This intersection line defines the periphery 36 of one of the finger-like extension members 30.

Now consider the family of streamlines of air which pass through the shock 46 along said periphery or intersection line 36. The portion of this family of streamlines downstream of said intersection, that is, the portion of said streamlines downstream of the conical shock 46, define a surface 34 which is used as the compression surface of a finger-like extension member 30. This portion of a few of such streamlines are indicated by lines a—a, b—b, c—c, d—d, and e—e on FIG. 11. The shape of such streamlines can be determined in an approximate manner by means of the method outlined in Technical Note 3349 of the National Advisory Committee for Aeronautics entitled "Application of the Generalized Shock-Expansion Method to Inclined Bodies of Revolution Traveling at High Supersonic Air Speeds." A sufficient number of streamlines such as a—a, b—b, etc. are determined to adequately define the compression surface 34.

The streamlines defining the surface 34 can also be determined by using Technical Report No. 3 of the Massachusetts Institute of Technology (MIT) entitled "Tables of Superonsic Flow Around Yawing Cones." Copending application Serial No. 507,649 of Antonio Ferri, filed May 11, 1955, describes in detail the use of M.I.T. Technical Report No. 1 entitled "Tables for Supersonic Flow Around Cones." These latter tables are for the situation in which the direction of the free air stream and the cone axis are parallel, that is, the cone yaw angle is zero. The tables of M.I.T. Technical Report No. 3 are for supersonic flow around cones having a small angle of yaw, as in the present case. In the case of supersonic flow around a cone having a zero angle of yaw, each streamline lies in a plane. However, with the cone having an angle of yaw, each streamline no longer lies in a plane and therefore three coordinates instead of just two are needed to define the line. Except for this difference the tables of Report No. 3 are used in substantially the same way as the Tables of Report No. 1 as described in said copending application. There is one difficulty, however, in the use of the tables of Report No. 3. The z velocity component as given in the tables is in error. Each value z given in the tables of Report No. 3 can, however, be corrected by changing its sign and then subtracting the quantity $2x/\sin\theta$ where the values of $x$ and $\theta$ are as given in said tables.

In the foregoing design of a compression surface 34 and its periphery 36 the forward tubular extension 40 of the engine body 12 was assumed to be a circular cylinder for reasons of simplicity. Obviously, however, a tubular body 40 other than a cylinder could be used. The radius R of the cylinder 40 is determined by the air inlet capture area required by the engine 10. The inlet design also depends on the cone yaw angle A, the vertex angle of the cone 44 and the distance D. The cone angle of attack or yaw angle A is selected so that the majority of the streamlines passing through the intersection 36, of the conical shock 46 with the closed contour 40, remain within said contour. Also this angle of attack A is kept small so that the velocity component of the streamlines normal to the inlet axis X—X is small. For example, this angle of attack A may be of the order of 6°. The distance D also affects said normal velocity component in that an increase in D decreases said velocity component. A vertex angle of 40° was selected for the hypothetical cone 44. This latter angle was a compromise between two considerations. A decrease in this vertex angle undesirably increases the axial length of the inlet. On the other hand an increase in this vertex angle increases the strength of the conical shock 46 thereby increasing the inlet air total pressure loss across this shock.

In this way the configuration of the surface 34 and outline 36 of one of the finger-like extension members 30 is determined. The other finger-like extension member 30 preferably is similar except that it is rotatively displaced 180° about the inlet axis X—X. With this construction, at the supersonic flight speed for which the inlet is designed, a conical shock wave is produced within the inlet off the periphery 36 of each finger-like member 30. Each such inlet conical shock wave corresponds to that portion of the hypothetical conical shock 46 in FIG. 11 which is downstream of its intersection with the cylinder 40 and therefore has been designated by the same reference numeral 46 in FIG. 2.

As is apparent from FIGS. 8, 9 and 10, the compression surface 34 of each member 30 has a convex ridge 50 running longitudinally along its center thereby leaving two longitudinally extending trough regions 52, one on each side of the ridge 50 of each compression surface 34a. As a result of the convex ridge 50 running along each compression surface 34, the static pressure is higher along said ridge thereby inducing lateral flow of air from said ridge toward the troughs 52. In this way the boundary layer from the central portion of each compression surface 34 flows laterally toward its two trough areas 52. Bleed holes 54 are provided along the trough regions 52 for removing the boundary air layer at each of these regions. These bleed holes can discharge into any space of lower pressure than that at their compression surface ends. For example, as illustrated in FIG. 8 these bleed holes 54 may simply lead to the outer cylindrical surface of its inlet extension member 30. Similar bleed holes 56 may also be provided in communication with the inlet throat for helping to stabilize the inlet normal shock in this region.

The two conical inlet shock waves 46 first intersect at the axis of the inlet as is apparent from FIGS. 2 and 8. This results in an increase in pressure in the central region of the inlet adjacent to the inlet throat where said two inlet shock waves 46 intersect and overlap. This relatively high pressure in the central region of the inlet facilitates starting of the inlet by inducing lateral air flow out through the side openings 32 between the finger-like extension members 30. Such air spillage downstream of the strong or normal shock marking the transition from supersonic to subsonic flow is generally necessary in order that the inlet start, that is, in order for said shock to move into the inlet to or downstream of the inlet throat 16.

To minimize the total pressure loss across the strong or normal shock marking the transition from supersonic to subsonic flow it is necessary to reduce the air flow supersonic velocity to a low value upstream of said shock, for example, to a Mach number of about 1.4 or lower. Hence, it is desired to obtain sufficient isentropic compression from the surfaces 34 to achieve a low supersonic Mach number at the inlet normal shock. For this purpose the downstream portion of the surfaces 34 preferably are modified from that determined by the method outlined in connection with FIG. 11 so as to provide additional isentropic turning of the entering air. That is, downstream of for example section 9—9 FIG. 2, the radial depth of each compression surface 34 from its outer cylindrical surface preferably is progressively increased slightly beyond that determined by the method of FIG. 11 so as to increase the isentropic compression provided by said surfaces 34. This added isentropic turning of the entering air is also provided to reduce the length of the compression surface 34 so as to reduce the length of the surface on which the boundary layer air can grow. Modification of the compression surfaces 34 is also provided to permit these surfaces to be faired into the inlet throat 16.

As described, the ramjet body member 12 is a cylinder and its hypothetical extension 40, used for constructing the compression surfaces 30 is likewise a cylinder. However, any closed tubular surface could be used in place of the cylinder 40 for this purpose. Likewise the inlet has been described as having two fingerlike compression members 30. Obviously, however, any number of such members may be provided. FIGS. 12 and 13 illustrate an inlet having four such finger-like comcompression members.

For ease of understanding those parts of FIGS. 12 and 13 corresponding to parts of FIGS. 1–10 have been designated by the same reference numerals but with a subscript $a$ added thereto. Although no bleed holes, corresponding to bleed holes 54 of FIGS. 1–10, have been illustrated in FIGS. 12–13 it is obvious that such bleed holes may also be provided in said latter modification. It is apparent therefore that FIGS. 12 and 13 are similar to FIGS. 1–10 except the inlet of FIGS. 12 and 13 has four instead of only two finger-like compression members 30$a$. Accordingly, no further description of FIGS. 12 and 13 is considered necessary.

While I have described my invention in detail in its present preferred embodiment it will be obvious to those skilled in the art after understanding my invention that various changes and modifications may be made therein without departing from the spirit or scope thereof.

I claim as my invention:

1. An air inlet structure for an air breathing jet engine comprising a body member having an air inlet passage; said inlet passage having an axis and said body member having a plurality of substantially identical finger-like members extending upstream therefrom and equally spaced about said inlet passage axis to form the inlet passage centrally between said members, said finger-like members being tapered in width as measured circumferentially about said axis such that the spacing between said members is a maximum at their upstream ends, the outer surface of each said finger-like member forming a smooth continuation of said body member and the inner surface of each said finger-like member is inclined to the inlet axis to form a supersonic compression surface for the air inlet.

2. An air inlet structure is recited in claim 1 in which the periphery of the upstream nose portion of each finger-like member is arcuate when viewed from a plane parallel to the inlet axis and perpendicular to a plane including the inlet axis and the longitudinal centerline of said member and in which said arcuate nose portion has a sharp peripheral edge to air axially approaching the inlet.

3. An air inlet structure for an air breathing jet engine comprising a body member having an air inlet passage; said inlet passage having an axis and said body member having a plurality of similar finger-like members extending upstream therefrom and equally spaced about said inlet passage axis to form the inlet passage centrally between said members, said finger-like members being tapered in width as measured circumferentially about said axis such that the spacing between said members is a maximum at their upstream ends, the outer surface of each said finger-like member forming a smooth continuation of said body member and the inner surface of each said finger-like member being inclined to the inlet axis to form a supersonic compression surface for the inlet, at least the upstream portion of the periphery of each finger-like member having a shape corresponding to the intersection of a conical surface with a forward extension of said body member.

4. An air inlet structure for an air breathing jet engine comprising a body member having an air inlet passage; said inlet passage having an axis and said body member having a plurality of similar finger-like members extending upstream therefrom and equally spaced about said inlet passage axis to form the inlet passage centrally between said members, said finger-like members being tapered in width as measured circumferentially about said axis such that the spacing between said members is a maximum at their upstream ends, the outer surface of each said finger-like member forming a smooth continuation of said body member and the inner surface of each said finger-like member being inclined to the inlet axis to form a supersonic compression surface for the inlet, at least the upstream portion of the periphery of each finger-like member having a shape corresponding to the intersection with a forward extension of said body member of a shock wave off a yawed cone in supersonic air streamline co-axial with said inlet and at least the forward portion of the inner compression surface of said finger-like member being defined by that portion of a family of said streamlines downstream of said shock wave, said family of streamlines passing through said intersection.

5. An air inlet structure for an air breathing jet engine comprising a body member having an air inlet passage; said inlet passage having an axis and said body member having a plurality of similar finger-like members extending upstream therefrom and equally spaced about said inlet passage axis to form the inlet passage centrally between said members, said finger-like members being tapered in width as measured circumferentially about said axis such that the spacing between said members is a maximum at their upstream ends, the outer surface of each said finger-like member forming a smooth continuation of said body member and the inner surface of each said finger-like member being inclined to the inlet axis to form a supersonic compression surface for the inlet, the compression surface of each finger-like member having a convex portion running longitudinally of said member along the center of its said compression surface.

6. An air inlet structure for an air breathing jet engine comprising a body member having an air inlet passage; said inlet passage having an axis and said body member having a plurality of similar finger-like members extending upstream therefrom and equally spaced about said inlet passage axis to form the inlet passage centrally between said members, said finger-like members being tapered in width as measured circumferentially about said axis such that the spacing between said members is a maximum at their upstream ends, the outer surface of each said finger-like member forming a smooth continuation of said body member and the inner surface of each said finger-like member being inclined to the inlet axis to form a supersonic compression surface for the inlet, the compression surface of each finger-like member having a convex ridge portion running longitudinally along the center of said surface and has two concave trough portions, one on each side of said ridge portion.

7. An air inlet structure for an air breathing jet engine comprising a body member having an air inlet passage; said inlet passage having an axis and said body member having a plurality of similar finger-like members extending upstream therefrom and equally spaced about said inlet passage axis to form the inlet passage centrally between said members, said finger-like members being tapered in width as measured circumferentially about said axis such that the spacing between said members is a maximum at their upstream ends, the outer surface of each said finger-like member forming a smooth continuation of said body member and the inner surface of each said finger-like member being inclined to the inlet axis to form a supersonic compression surface for the inlet, the compression surface of each finger-like member having a convex ridge portion running longitudinally along the center of said surface and having two concave trough portions, one on each of said ridge portions, and including passage means opening through each compression surface along its trough portions for bleeding off the adjacent boundary layer air.

8. An air inlet structure for an air breathing jet engine comprising a body member having an air inlet passage; said inlet passage having an axis and said body member having a plurality of substantially identical finger-like members extending upstream therefrom and equally spaced about said inlet passage axis to form the inlet passage centrally between said members, said finger-like members being tapered in width as measured circumferentially about said axis such that the spacing between said members is a maximum at their upstream ends, the outer surface of each said finger-like member forming a smooth continuation of said member and the inner surface of each said finger-like member being such that the radial thickness of said member progressively increases in a downstream direction from its upstream end whereby each said inner surface forms a supersonic compression surface for the air inlet.

9. An air inlet structure as recited in claim 8 in which the external surface of the portion of said body member from which said finger-like members extend is annular and is a circular cylindrical surface and the outer surface of each of said finger-like members is likewise cylindrical.

References Cited in the file of this patent
UNITED STATES PATENTS

| | | |
|---|---|---|
| 2,772,620 | Ferri | Dec. 4, 1956 |
| 2,788,183 | Ferri | Apr. 9, 1957 |
| 2,876,621 | Bogert | Mar. 10, 1959 |
| 2,938,334 | McLafferty | May 31, 1960 |
| 2,939,651 | Kaplan | June 7, 1960 |
| 2,970,431 | Harshman | Feb. 7, 1961 |

OTHER REFERENCES

Publication: Flight "Thunderchief," vol. 71, No. 2523, May 31, 1957; page 724.